Patented Feb. 20, 1951

2,542,008

UNITED STATES PATENT OFFICE 2,542,008

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 22, 1949, Serial No. 89,140

20 Claims. (Cl. 252—342)

This invention relates to processes or procedures particularly adapted for preventing, breaking, or resolving emulsions of the water-in-oil type, and particularly petroleum emulsions. This application is a continuation-in-part of our co-pending application Serial No. 751,614, filed May 31, 1947 (now abandoned). Attention is also directed to our co-pending application Serial No. 64,468, filed December 8, 1948 (now abandoned), and also Serial No. 30,183, filed May 29, 1948, now Patent No. 2,498,656, dated February 28, 1950.

Complementary to the above aspect of the invention herein described, is our companion invention concerned with the new chemical products or compounds used as the demulsifying agents in said aforementioned processes or procedures, as well as the application of such chemical compounds, products, and the like, in various other arts and industries, along with the method for manufacturing said new chemical products or compounds which are of outstanding value in demulsification. See our co-pending application Serial No. 89,141, filed April 22, 1949.

Our invention provides an economical and rapid process, for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventive step of commingling the demulsifier with the aqueous component which would or might subsequently become either phase of the emulsion, in the absence of such precautionary measure. Similarly, such demulsifier may be mixed with the hydrocarbon component.

Briefly stated, the present process is concerned with the breaking or resolving of petroleum emulsions by means of certain esters which are, in turn, derivatives of specific synthetic products. These products are, in turn, the oxyalkylated derivatives of certain resins hereinafter specified.

Thus, the present process is concerned with breaking petroleum emulsions of the water-in-oil type characterized by subjecting the emulsion to the action of a drastically-oxidized ester of hydrophile hydroxylated synthetic products; the acyl radical of said ester being that of an unsaturated higher fatty acid having at least 8 and not more than 22 carbon atoms; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent - soluble, water - insoluble phenolaldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

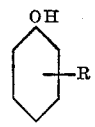

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the further proviso that the hydrophile properties of the ester as well as the oxyalkylated resin in an equal weight of xylene are sufficient to produce an emulsion when said xylene solution is shaken vigorously with one to three volumes of water; and with the final proviso that said drastic-oxidation of the ester be by means of a gaseous oxygen containing medium. Drastic oxidation previously referred to is obtained by gaseous oxygen-containing mediums such as moist air, dried air, oxygen, ozone, etc.

For purpose of convenience, what is said hereinafter will be divided into five parts. Part 1 will be concerned with the production of the resin from a difunctional phenol and an aldehyde; Part 2 will be concerned with the oxyalkylation of the resin so as to convert it into a hydrophile hydroxylated derivative; Part 3 will be concerned with the conversion of the immediately aforementioned derivative into a partial or total ester of an unsaturated higher fatty acid having at least 8 and not more than 22 carbon atoms, and preferably, the total ester; Part 4 will be concerned with the drastic oxidation of said immediately aforementioned ester by means of a gaseous oxygen-containing medium such as air; and Part 5 will be concerned with the uses of such esters as demulsifiers, as hereinafter described.

PART 1

As to the preparation of the phenol-aldehyde resins, reference is made to our co-pending application Serial Nos. 8,730 and 8,731, both filed February 16, 1948 (both now abandoned). In such co-pending applications we described a fusible, organic solvent-soluble, water-insoluble resin polymer of the formula:

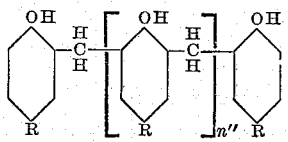

In such idealized representation $n''$ is a numeral varying from 1 to 13, or even more, provided that the resin is fusible and organic solvent-soluble. R is a hydrocarbon radical having at least 4 and not over 8 carbon atoms. In the instant application R may have as many as 12 carbon atoms, as in the case of a resin obtained from a dodecylphenol. In the instant invention it may be first suitable to describe the alkylene oxides employed as reactants, then the aldehydes, and finally the phenols, for the reason that the latter require a more elaborate description.

The alkylene oxides which may be used are the alpha-beta oxides having not more than 4 carbon atoms, to wit, ethylene oxide, alpha-beta propylene oxide, alpha-beta butylene oxide, glycide, and methyl-glycide.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins, is particularly advantageous. Solid polymers of formaldehyde are more expensive, and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde, on one hand, and a comparable product prepared from the same phenolic reactant and heptaldehyde, on the other hand. The former, as shown in certain subsequent examples, is a hard, brittle, solid, whereas, the latter is soft and tacky, and obviously easier to handle in the subsequent oxyalkylation procedure.

Cyclic aldehydes may be employed, particularly benzaldehyde. The employment of furfural requires careful control, for the reason that, in addition to its aldehydic function, furfural can form vinyl condensations by virtue of its unsaturated structure. The production of resins from furfural for use in preparing reactants for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as intermediates in this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts, they enter into the condensation reaction, and, in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated, but also the hydroxides of the alkali metals, hydroxides of the alkaline earth metals, salts of strong bases and weak acids, such as sodium acetate, etc.

Suitable phenolic reactants include the following: Para-tertiarybutylphenol; para-secondary-butylphenol; para-tertiary-amylphenol; para-secondary-amylphenol; para-tertiary-hexylphenol; para-isooctylphenol; ortho-phenylphenol; para-phenylphenol; ortho-benzylphenol; para-benzylphenol; and para-cyclohexylphenol, and the corresponding ortho-para-substituted metacresols and 3,5-xylenols. Similarly, one may use para- or ortho-nonylphenol or a mixture, para- or ortho-decylphenol or a mixture, menthylphenol, or para- or ortho-dodecylphenol.

For convenience, the phenol has previously been referred to as monocyclic, in order to differentiate from fused nucleus polycyclic phenols, such as substituted naphthols. Specifically "monocyclic" is limited to the nucleus in which the hydroxyl radical is attached. Broadly speaking, where a substituent is cyclic, particularly aryl, obviously in the usual sense such phenol is actually polycyclic, although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

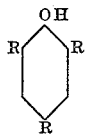

in which R is selected from the class consisting of hydrogen atoms and hydrocarbon radicals having at least 4 carbon atoms and not more than 12 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2, 4, 6 position, again with the provision as to 3 or 3,5 methyl substitution. This is conventional nomenclature, numbering the various positions in the usual clockwise manner, beginning with the hydroxyl position as one:

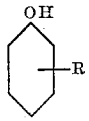

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 12 carbon atoms, is well known. As has been previously pointed out, there is no objection to a methyl radical provided it is present in the 3 or 5 position.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus. Sometimes when higher aldehydes are used an excess of aldehydic reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

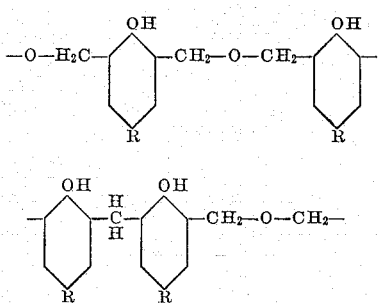

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic method using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalyst. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substituent approximates the upper limit specified herein, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins as that term is used herein.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfo-acid and a mineral acid as a catalyst, and xylene as a solvent. By way of illustration, certain subsequent examples are included, but it is to be understood the herein described invention is not concerned with the resins per se or with any particular method of manufacture but is concerned with the use of reactants obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\tfrac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethylol or a substituted hydroxymethylol group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous, rubbery, or at least not hydrophile. As to the rationale of resinification, note particularly what is said hereafter in differentiating between resoles, Novolaks, and resins obtained solely from difunctional phenols.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment if it is employed as part of resin manufacture.

Our routine procedure in examining a phenol for suitability for preparing intermediates to be used in practicing the invention is to prepare a resin employing formaldehyde in excess (1.2 moles of formaldehyde per mole of phenol) and using an acid catalyst in the manner described in Example 1a of our Patent 2,499,370 granted March 7, 1950. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation due to the presence of a small amount of trireactive phenol, as previously mentioned, or for some other reason, it may become extremely insoluble, and no longer qualifies as being hydrophile as herein specified. Increasing the size of the aldehydic nucleus, for instance using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and they may lead to cross-linking.

In this connection it may be well to point out that part of these reactions are now understood or explainable to a greater or lesser degree in light of a most recent investigation. Reference is made to the researches of Zinke and his co-workers, Hultzsch and his associates, and to von Eulen and his co-workers, and others. As to a bibliography of such investigations, see Carswell, "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a "most typical type" of fusible resin and forget for the time that such resin, at least under certain circumstances, is susceptible to further complications. Subsequently in the text it will be pointed out that cross-linking or reaction with excess formaldehyde may take place even with one of such "most typical type" resins. This point is made for the reason that insolubles must be avoided in order to obtain the products herein contemplated for use as reactants.

The "typical type" of fusible resin obtained from a para-blocked or ortho-blocked phenol is clearly differentiated from the Novolak type or resole type of resin. Unlike the resole type, such "typical type" para-blocked or ortho-blocked phenol resin may be heated indefinitely without passing into an infusible stage, and in this respect is similar to a Novolak. Unlike the Novolak type the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as for example the use of two moles of formaldehyde to one of phenol, along with an alkaline catalyst. This peculiar hardening or curing or cross-linking of resins obtained from difunctional phenols has been recognized by various authorities.

The intermediates herein used must be hydrophile or sub-surface-active or surface-active as hereinafter described, and this precludes the formation of insolubles during resin manufacture or the subsequent stage of resin manufacture where heat alone, or heat and vacuum, are employed, or in the oxyalkylation procedure. In its simplest presentation the rationale of resinification involving formaldehyde, for example, and a difunctional phenol would not be expected to form cross-links. However, cross-linking sometimes occurs and it may reach the objectionable stage. However, provided that the preparation of resins simply takes into cognizance the present knowledge of the subject, and employing preliminary, exploratory routine examinations as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws, or Lockerstellen, which is employed in explaining flaw-forming groups due to the fact that a CH₂OH radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldehyde resins derived from difunctional phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word "fusible." Ordinarily a thermoplastic resin is identified as one which can be heated repeatedly and still not lose its themoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

The oxyalkylation-susceptible, water-insoluble, organic solvent-soluble, fusible, phenol-aldehyde resins derived from specified difunctional phenols and aldehydes, used as intermediates for the preparation of the products used in the practice of the present invention are exemplified by the Examples Nos. 1a through 103a of our Patent 2,499,370, granted March 7, 1950, and reference is made to that patent for exemplification of these intermediates.

Previous reference has been made to the use of a single phenol as herein specified, or a single reactive aldehyde, or a single oxyalkylating agent. Obviously, mixtures of reactants may be employed, as for example a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins, in what would actualy be a mechanical mixture, although such mixture might exhibit some unique properties as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the oxyalkylated derivatives of such resins, derived from such plurality of reactants, instead of being limited to a single reactant from each of the three classes, is contemplated and here included for the reason that they are obvious variants.

PART 2

Having obtained a suitable resin of the kind described, such resin is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3, and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the initial reactants used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent, as well as a reactant in the earlier stages along with ethylene oxide, for instance, by dissolving the powdered resin in propylene oxide, even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenolaldehyde resins of the type herein specified possess reactive hydroxyl groups and are oxyalkylation-susceptible.

Considerable of what is said immediately hereinafter is concerned with ability to vary the hydrophile properties of the hydroxylated intermediate reactants from minimum hydrophile properties to maximum properties. Such properties, in turn, of course, are affected subsequently by the acid employed for esterification and the quantitative nature of the esterification itself, i. e., whether it is total or partial. It may be well, however, to point out what has been said elsewhere in regard to the hydroxylated intermediate reactants. See, for example, our co-pending applications, Serial Nos. 8,730 and 8,731, both filed February 16, 1948, and Serial No. 42,133, filed August 2, 1948, and Serial No. 42,134, filed August 2, 1948 (all four cases now abandoned). The reason is that the esterification, depending upon the acid selected, may vary the hydrophile-hydrophobe balance in one direction, or the other, and also invariably causes the development of some property which makes it inherently different from the two reactants from which the derivative ester is obtained.

Referring to the hydrophile hydroxylated intermediates, even more remarkable and equally difficult to explain, are the versatility and the utility of these compounds considered as chemical reactants as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkyated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the polyhydric reactants used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare polyhydric reactants for use in the preparation of compounds employed in the present invention, is to determine the hydroxyl value by the Verley-Bölsing method or its equivalent. The resin as such, or in the form of a solution as described, is then treated with ethylene oxide in presence of 0.5% to 2% of sodium methylate as a catalyst in step-wise fashion. The conditions of reaction, as far as time or per cent are concerned, are within the range previously indicated. With suitable agitation, the ethylene oxide, if added in molecular proportion, combines within a comparatively short time, for instance, a few minutes to 2 to 6 hours, but in some instances, requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50% by weight of the original resin, a sample is tested for incipient hydrophile properties by simply shaking up in water as is, or after the elimination of the solvent if a solvent is present. The amount of ethylene oxide used to obtain a useful demulsifying agent as a rule varies from 70% by weight of the original resin, to as much as five or six times the weight of the original resin. In the case of a resin derived from para-tertiary butylphenol, as little as 50% by weight of ethylene oxide may give suitable solubility. With propylene oxide even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressure noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C., as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface-activity show unusual properties as the hydrophile character varies from a minimum to an ultimate maximum. One should not underestimate the utility of any of these polyhydric alcohols in a surface-active or sub-surface-active range, without examining them by reaction with a number of the typical acids herein described, and subsequently, examining the resultant for utility, either in demulsification, or in some other art or industry as referred to elsewhere, or as a reactant for the manufacture of more complicated derivatives. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a premanent translucent sol when viewed in a comparatively thin layer, for instance the depth of a test tube. Ultimate hydrophile character is usually shown at the 15 to 1 ratio test in that adding a small amount of an insoluble solvent, for instance 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75% by weight, for example 65% by weight, of the resin to be oxyethylated; a second example using approximately 200% to 300% by weight, and a third example using about 500% to 750% by weight, to explore the range of hydrophile-hydrophobe balance.

A practical examination of the factor of oxyalkylation level can be made by a very simple test using a pilot plant autoclave having a capacity of about 10 to 15 gallons as hereinafter described. Such laboratory-prepared routine compounds can then be tested for solubility and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

If one purchases a thermoplastic or fusible resin on the open market selected from a suitable number which are available, one might have to make certain determinations in order to make the quickest approach to the appropriate oxyalkylation range. For instance, one should know (a) the molecular size, indicating the number of phenolic units; (b) the nature of the aldehydic residue, which is usually CH$_2$; and (c) the nature of the substituent, which is usually butyl, amyl, or phenyl. With such information one is in substantially the same position as if one had personally made the resin prior to oxyethylation.

For instance, the molecular weight of the internal structural units of the resin of the following over-simplified formula:

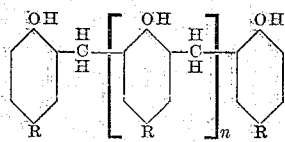

($n=1$ to 13, or even more)

is given approximately by the formula: (Mol. wt. of phenol $-2$) plus mol. wt. of methylene or substituted methylene radical. The molecular weight of the resin would be $n$ times the value for the internal limit plus the values for the terminal units. The left-hand terminal unit of the above structural formula, it will be seen, is identical with the recurring internal unit except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several per cent; but as it grows larger, to contain 6, 9, or 12 phenolic nuclei, the formula comes to be more than satisfactory. Using such an approximate weight, one need only introduce, for example, two molal weights of ethylene oxide or slightly more, per phenolic nucleous, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

The production of suitable oxyalkylation products from resins for use in producing products used in accordance with the present invention is exemplified by Examples 1b through 18b of Patent 2,499,370 and by the tables which appear in columns 51 through 56 of that patent, and reference is made thereto for examples of these intermediates.

The resins, prior to oxyalklation, vary from tacky, viscous liquids to hard, high-melting solids. Their color varies from a light yellow through amber, to a deep red or even almost black. In the manufacture of resins, particularly hard resins, as the reaction progresses the reaction mass frequently goes through a liquid state to a sub-resinous or semi-resinous state, often characterized by being tacky or sticky, to a final complete resin. As the resin is subjected to oxyalkylation these same physical changes tend to take place in reverse. If one starts with a solid resin, oxyalkylation tends to make it tacky or semi-resinous and further oxyalkylation makes the tackiness disappear and changes the product to a liquid. Thus, as the resin is oxyalkylated it decreases in viscosity, that is, becomes more liquid or changes from a solid to a liquid, particularly when it is converted to the water-dispersible or water-soluble stage. The color of the oxyalkylated derivative is usually considerably lighter than the original product from which it is made, varying from a pale straw color to an amber or reddish amber. The viscosity usually varies from that of an oil, like castor oil, to that of a thick viscous sirup. Some products are waxy. The presence of a solvent, such as 15% xylene or the like, thins the viscosity considerably and also reduces the color in dilution. No undue significance need be attached to the color for the reason that if the same compound is prepared in glass and in iron, the latter usually has somewhat darker color. If the resins are prepared as customarily employed in varnish resin manufacture, i. e., a procedure that excludes the presence of oxygen during the resinification and subsequent cooling of the resin, then of course the initial resin is much lighter in color. We have employed some resins which initially are almost water-white and also yield a lighter colored final product.

Actually, in considering the ratio of alkylene oxide to add, and we have previously pointed out that this can be predetermined using laboratory tests, it is our actual preference from a practical standpoint to make tests on a small pilot plant scale. Our reason for so doing is that we make one run, and only one, and that we have a complete series which shows the progressive effect of introducing the oxyalkylating agents, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete. We have pointed out that soft resins which are fluid or semi-fluid can be readily prepared in various ways, such as the use of ortho-tertiary amylphenol, ortho-hydroxydiphenyl, ortho-decylphenol, or by the use of higher molecular weight aldehydes than formaldehyde. If such resins are used, a solvent need not be added, but may be added as a matter of convenience, or for comparison, if desired. We then add a catalyst, for instance, 2% of caustic soda, in the form of a 20% to 30% solution, and remove the water of solution or formation. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points, as indicated in the following table:

| Percentages | Pounds of Ethylene Oxide Added per 8-pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface activity can be measured in any one of the usual ways using a DuNouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful as polyhydric reactants for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation but not in the earlier stages. In other words, with resins from some such phenols, addition of 2 or 3 moles of the oxyalkylating agent per phenolic nucleus, particularly ethylene oxide, gives a surface-active reactant which is perfectly satisfactory, while more extensive oxyethylation yields an insoluble rubber, that is, an unsuitable reactant. It is obvious that this present procedure of evaluating trifunctional phenol tolerance is more suitable than the previous procedure.

It may be well to call attention to one result which may be noted in a long drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency toward a rubbery stage, is not objectionable so long as the final product is still hydrophile and at least sub-surface-active. Such material frequently is best mixed with a polar solvent, such as alcohol or the like, and preferably an alcoholic solution is used. The point which we want to make here, however, is this: Stringiness or rubberization at this stage may possibly be the result of etherification. Obviously if a difunctional phenol and an aldehyde produce a non-cross-linked resin molecule and if such molecule is oxyalkylated so as to introduce a plurality of hydroxyl groups in each molecule, then and in that event if subsequent etherification takes place, one is going to obtain cross-linking in the same general way that one would obtain cross-linking in other resinification reactions. Ordinarily there is little or no tendency toward etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° or 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

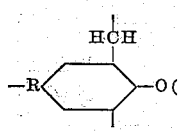 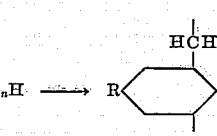 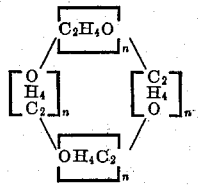

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use as polyhydric reactants in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains of ethyleneoxy units would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semipolar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde, in presence of an acid catalyst, will have a molecular weight indicating 3, 4, 5 or somewhat greater number of structural units per molecule. If more drastic conditions of resinification are employed, or if such low-stage resin is subjected to a vacuum distillation, treatment, as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of such dimers from substituted phenols, see Carswell "Phenoplasts," page 31. The increased viscosity, resinous character, and decreased solubility, etc., of the higher polymers, in comparison with the dimer, frequently are all that is required to establish that the resin contains 3 or more structural units per molecule.

Ordinarily, the oxyalkylation is carried out in autoclaves provided with agitators or stirring devices. We have found that the speed of the agitation markedly influences the reaction time. In some cases, the change from slow speed agitation, for example, in a laboratory autoclave agitation with a stirrer operating at a speed of 60 to 200 R. P. M., to high speed agitation, with the stirrer operating at 250 to 350 R. P. M., reduces the time required for oxyalkylation by about one-half to two-thirds. Frequently xyiene-soluble products which give insoluble products by procedures employing comparatively slow speed agitation, give suitable hydrophile products when produced by similar procedure, but with high speed agitation, as a result, we believe, of the reduction in the time required with consequent elimination or curtailment of opportunity for curing or etherization. Even if the formation of an insoluble product is not involved, it is frequently advantageous to speed up the reaction, thereby reducing production time, by increasing agitating speed. In large scale operations, we have demonstrated that economical manufacturing results from continuous oxyalkylation, i. e., an operation in which the alkylene oxide is continuously fed to the reaction vessel, with high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

Previous reference has been made to the fact that in preparing esters or compounds of the kind herein described, particularly adapted for demulsification of water-in-oil emulsions, and for that matter, for other purposes, one should make a complete exploration of the wide variation in hydrophobe-hydrophile balance, as previously referred to. It has been stated, furthermore, that this hydrophobe-hydrophile balance of the oxyalkylated resins is imparted, as far as the range of variation goes, to a greater or lesser extent to the herein described derivatives. This means that one employing the present invention should take the choice of the most suitable derivative selected from a number of representative compounds, thus, not only should a variety of resins be prepared exhibiting a variety of oxyalkylations, particularly oxyethylation, but also a variety of derivatives. This can be done conveniently in light of what has been said previously. From a practical standpoint, using pilot plant equipment, for instance, an autoclave having a capacity of approximately three to five gallons. We have made a single run by appropriate selections in which the molal ratio of resin equivalent to ethylene oxide is one to one, 1 to 5, 1 to 10, 1 to 15, and 1 to 20. Furthermore, in making these particular runs, we have used continuous addition of ethylene oxide. In the continuous addition of ethylene oxide we have employed either a cylinder of ethylene oxide without added nitrogen, provided that the pressure of the ethylene oxide was sufficiently great to pass into the autoclave, or else, we have used an arrangement, which, in essence, was the equivalent of an ethylene oxide cylinder with a means for injecting nitrogen so as to force out the ethylene oxide in the manner of an ordinary seltzer bottle, combined with the means for either weighing the cylinder, or measuring the ethylene oxide used volumetrically. Such procedure and arrangement for injecting liquids, is, of course, conventional. The following data sheets exemplify such operations, i. e., the combination of both continuous agitation and taking samples so as to give five different variants in oxyethylation. In adding ethylene oxide continuously, there is one precaution which must be taken at all times. The addition of ethylene oxide must stop immediately, if there is any indication that reaction is stopped, or, obviously, if reaction is not started at the beginning of the reaction period. Since the addition of ethylene oxide is invariably an exothermic reaction, whether or not reaction has taken place can be judged in the usual manner, by observing (a) temperature rise or drop, if any, (b) amount of cooling water or other means required to dissipate heat of reaction; thus, if there is a temperature drop without the use of cooling water or equivalent, or if there is no rise in temperature without using cooling water control, careful investigation should be made.

In the tables immediately following, we are showing the maximum temperature which is usually the operating temperature. In other words, by experience, we have found that if the initial reactants are raised to the indicated temperature and then if ethylene oxide is added slowly, this temperature is maintained by cooling water until the oxyethylation is complete. We have also indicated the maximum pressure that we obtained or the pressure range. Likewise, we have indicated the time required to inject the ethylene oxide as well as a brief note as to the solubility of the product at the end of the oxyethylation period. As one period ends it will be noted we have removed part of the oxyethylated mass to give us derivatives, as therein described; the rest has been subjected to further treatment. All this is apparent by examining the columns headed "Starting mix," "Mix at end of reaction," "Mix which is removed for sample," and "Mix which remains as next starter."

The resins employed are prepared in the manner described in Examples Nos. 1a through 103a inclusive of our Patent 2,499,370, and are identified by reference to the example number of that patent. Instead of being prepared on a laboratory scale they were prepared in 10 to 15-gallon electro-vapor heated synthetic resin pilot plant reactors, as manufactured by the Blaw-Knox Company, Pittsburgh, Pennsylvania, and completely described in their Bulletin No. 2087, issued in 1947, with specific reference to Specification No. 71-3965.

For convenience, reference is made in the folfoling tables to the example number of our said Patent 2,499,370 wherein the preparation of identical laboratory-size batches is described, and it is understood that these operations simply involve pilot plant operation, instead of laboratory operation.

The solvent used in each instance was xylene. This solvent is particularly satisfactory, for the reason that it can be removed readily by distillation or vacuum distillation. In these continuous experiments the speed of the stirrer in the autoclave was 250 R. P. M.

In examining the subsequent tables it will be noted that if a comparatively small sample is taken at each stage, for instance, one-half to one gallon, one can proceed through the entire molal stage of 1 to 1, to 1 to 20, without remaking at any intermediate stage. This is illustrated by Example 104a. In other examples we found it desirable to take a larger sample, for instance, a 3-gallon sample, at an intermediate stage. As a result, it was necessary in such instances to start with a new resin sample, in order to prepare sufficient oxyethylated derivatives illustrating the latter stages. Under such circumstances, of course, the earlier stages which had been previously prepared were by-passed or ignored. This is illustrated in the tables, where, obviously, it shows that the starting mix was not removed from a previous sample.

*Phenol for resin: Para-tertiary amylphenol*    *Aldehyde for resin: Formaldehyde*

Date, June 22, 1948

[Resin made in pilot plant size batch, approximately 25 pounds, corresponding to 3a of Patent 2,499,370 but this batch designated 104a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 104b | 14.25 | 15.75 | 0 | 14.25 | 15.75 | 4.0 | 3.35 | 3.65 | 1.0 | 10.9 | 12.1 | 3.0 | 80 | 150 | 1/4 | I |
| *Second Stage* Resin to EtO Molal Ratio 1:5 Ex. No. 105b | 10.9 | 12.1 | 3.0 | 10.9 | 12.1 | 15.25 | 3.77 | 4.17 | 5.31 | 7.13 | 7.93 | 9.94 | 70 | 158 | 1/2 | ST |
| *Third Stage* Resin to EtO Molal Ratio 1:10 Ex. No. 106b | 7.13 | 7.93 | 9.94 | 7.13 | 7.93 | 19.69 | 3.29 | 3.68 | 9.04 | 3.84 | 4.25 | 10.65 | 60 | 173 | 1/3 | FS |
| *Fourth Stage* Resin to EtO Molal Ratio 1:15 Ex. No. 107b | 3.84 | 4.25 | 10.65 | 3.84 | 4.25 | 16.15 | 2.04 | 2.21 | 8.55 | 1.80 | 2.04 | 7.60 | 220 | 160 | 1/6 | RS |
| *Fifth Stage* Resin to EtO Molal Ratio 1:20 Ex. No. 108b | 1.80 | 2.04 | 7.60 | 1.80 | 2.04 | 10.2 | | | | | | | 100 | 150 | 1/3 | QS |

I = Insoluble.    ST = Slight tendency toward becoming soluble.    FS = Fairly soluble.    RS = Readily soluble.    QS = Quite soluble.

*Phenol for resin: Nonylphenol*    *Aldehyde for resin: Formaldehyde*

Date, June 18, 1948

[Resin made in pilot plant size batch, approximately 25 pounds, corresponding to 70a of Patent 2,499,370 but this batch designated 109a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 109b | 15.0 | 15.0 | 0 | 15.0 | 15.0 | 3 | 5.0 | 5.0 | 1.0 | 10.0 | 10.0 | 2.0 | 50 | 150 | 1 3/4 | ST |
| *Second Stage* Resin to EtO Molal Ratio 1:5 Ex. No. 110b | 10 | 10 | 2.0 | 10 | 10 | 9.4 | 2.72 | 2.72 | 2.56 | 7.27 | 7.27 | 6.86 | 100 | 147 | 2 | DT |
| *Third Stage* Resin to EtO Molal Ratio 1:10 Ex. No. 111b | 7.27 | 7.27 | 6.86 | 7.27 | 7.27 | 13.7 | 4.16 | 4.16 | 7.68 | 3.15 | 3.15 | 5.95 | 125 | 155 | 1 3/4 | S |
| *Fourth Stage* Resin to EtO Molal Ratio 1:15 Ex. No. 112b | 3.15 | 3.15 | 5.95 | 3.15 | 3.15 | 8.95 | 1.05 | 1.05 | 2.95 | 2.10 | 2.10 | 6.00 | 220 | 174 | 2 1/4 | S |
| *Fifth Stage* Resin to EtO Molal Ratio 1:20 Ex. No. 113b | 2.10 | 2.10 | 6.00 | 2.10 | 2.10 | 8.00 | | | | | | | 220 | 183 | 2/3 | VS |

S = Soluble.    ST = Slight tendency toward solubility.    DT = Definite tendency toward solubility.    VS = Very soluble.

*Phenol for resin: Para-octylphenol*  *Aldehyde for resin: Formaldehyde*

Date, June 23, 24, 1948

[Resin made in pilot plant size batch, approximately 25 pounds, corresponding to 8a of Patent 2,499,370 but this batch designated 114a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 114b | 14.2 | 15.8 | 0 | 14.2 | 15.8 | 3.25 | 3.1 | 3.4 | 0.75 | 11.1 | 12.4 | 2.5 | 50 | 150 | 1½ | NS |
| *Second Stage* | | | | | | | | | | | | | | | | |
| Resin to EtO Molal Ratio 1:5 Ex. No. 115b | 11.1 | 12.4 | 2.5 | 11.1 | 12.4 | 12.5 | 7.0 | 7.82 | 7.88 | 4.1 | 4.58 | 4.62 | 100 | 171 | ½ | SS |
| *Third Stage* | | | | | | | | | | | | | | | | |
| Resin to EtO Molal Ratio 1:10 Ex. No. 116b | 6.64 | 7.36 | 0 | 6.64 | 7.36 | 15.0 | ----- | ----- | ----- | ----- | ----- | ----- | 120 | 190 | 1½ | S |
| *Fourth Stage* | | | | | | | | | | | | | | | | |
| Resin to EtO Molal Ratio 1:15 Ex. No. 117b | 4.40 | 4.9 | 0 | 4.4 | 4.9 | 14.8 | ----- | ----- | ----- | ----- | ----- | ----- | 400 | 160 | ½ | VS |
| *Fifth Stage* | | | | | | | | | | | | | | | | |
| Resin to EtO Molal Ratio 1:20 Ex. No. 118b | 4.1 | 4.58 | 4.62 | 4.1 | 4.58 | 18.52 | ----- | ----- | ----- | ----- | ----- | ----- | 260 | 172 | ½ | VS |

S=Soluble.   NS=Not soluble.   SS=Somewhat soluble.   VS=Very soluble.

*Phenol for resin: Menthylphenol*  *Aldehyde for resin: Formaldehyde*

Date, July 8–13, 1948

[Resin made in pilot plant size batch, approximately 25 pounds, corresponding to 69a of Patent 2,499,370 but this batch designated 119a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 119b | 13.65 | 16.35 | 0 | 13.65 | 16.35 | 3.0 | 9.55 | 11.45 | 2.1 | 4.1 | 4.9 | 0.9 | 60 | 150 | 1½ | NS |
| *Second Stage* | | | | | | | | | | | | | | | | |
| Resin to EtO Molal Ratio 1:5 Ex. No. 120b | 10 | 12 | 0 | 10 | 12 | 10.75 | 4.52 | 5.42 | 4.81 | 5.48 | 6.58 | 5.94 | 140 | 160 | 1 5/12 | S |
| *Third Stage* | | | | | | | | | | | | | | | | |
| Resin to EtO Molal Ratio 1:10 Ex. No. 121b | 5.48 | 6.58 | 5.94 | 5.48 | 6.58 | 10.85 | ----- | ----- | ----- | ----- | ----- | ----- | 90 | 160 | ¼ | S |
| *Fourth Stage* | | | | | | | | | | | | | | | | |
| Resin to EtO Molal Ratio 1:15 Ex. No. 122b | 4.1 | 4.9 | 0.9 | 4.1 | 4.9 | 13.15 | ----- | ----- | ----- | ----- | ----- | ----- | 180 | 171 | 1 5/12 | VS |
| *Fifth Stage* | | | | | | | | | | | | | | | | |
| Resin to EtO Molal Ratio 1:20 Ex. No. 123b | 3.10 | 3.72 | 0.68 | 3.10 | 3.72 | 13.43 | ----- | ----- | ----- | ----- | ----- | ----- | 320 | 170 | ¾ | VS |

S=Soluble.   NS=Not soluble.   VS=Very soluble.

*Phenol for resin: Para-secondary butylphenol*     *Aldehyde for resin: Formaldehyde*

Date, July 14–15, 1948

[Resin made in pilot plant size batch, approximately 25 pounds, corresponding to 2a of Patent 2,499,370 but this batch designated 124a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* | | | | | | | | | | | | | | | | |
| Resin to EtO Molal Ratio 1:1 Ex. No. 124b | 14.45 | 15.55 | 0 | 14.45 | 15.55 | 4.25 | 5.97 | 6.38 | 1.75 | 8.48 | 9.17 | 2.50 | 60 | 150 | 5½ | NS |
| *Second Stage* | | | | | | | | | | | | | | | | |
| Resin to EtO Molal Ratio 1:5 Ex. No. 125b | 8.48 | 9.17 | 2.50 | 8.48 | 9.17 | 16.0 | 5.83 | 6.32 | 11.05 | 2.65 | 2.85 | 4.95 | 95 | 188 | ½ | SS |
| *Third Stage* | | | | | | | | | | | | | | | | |
| Resin to EtO Molal Ratio 1:10 Ex. No. 126b | 4.82 | 5.18 | 0 | 4.82 | 5.18 | 14.25 | | | | | | | 400 | 183 | ½ | S |
| *Fourth Stage* | | | | | | | | | | | | | | | | |
| Resin to EtO Molal Ratio 1:15 Ex. No. 127b | 3.85 | 4.15 | 0 | 3.85 | 4.15 | 17.0 | | | | | | | 120 | 180 | ⅔ | VS |
| *Fifth Stage* | | | | | | | | | | | | | | | | |
| Resin to EtO Molal Ratio 1:20 Ex. No. 128b | 2.65 | 2.85 | 4.95 | 2.65 | 2.85 | 15.45 | | | | | | | 80 | 170 | 5½ | VS |

S = Soluble.     NS = Not soluble.     SS = Somewhat soluble.     VS = Very soluble.

*Phenol for resin: Menthyl*     *Aldehyde for resin: Propionaldehyde*

Date, August 12–13, 1948

[Resin made on pilot plant size batch, approximately 25 pounds, corresponding to 81a of Patent 2,499,370 but this batch designated 129a.]

|  | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| *First Stage* | | | | | | | | | | | | | | | | |
| Resin to EtO Molal Ratio 1:1 Ex. No. 129b | 12.8 | 17.2 |  | 12.8 | 17.2 | 2.75 | 4.25 | 5.7 | 0.95 | 8.55 | 11.50 | 1.80 | 110 | 150 | ½ | Not soluble. |
| *Second Stage* | | | | | | | | | | | | | | | | |
| Resin to EtO Molal Ratio 1:5 Ex. No. 130b | 8.55 | 11.50 | 1.80 | 8.55 | 11.50 | 9.3 | 4.78 | 6.42 | 5.2 | 3.77 | 5.08 | 4.10 | 100 | 170 | ½ | Somewhat soluble. |
| *Third Stage* | | | | | | | | | | | | | | | | |
| Resin to EtO Molal Ratio 1:10 Ex. No. 131b | 3.77 | 5.08 | 4.10 | 3.77 | 5.08 | 13.1 | | | | | | | 100 | 182 | ½ | Soluble. |
| *Fourth Stage* | | | | | | | | | | | | | | | | |
| Resin to EtO Molal Ratio 1:15 Ex. No. 132b | 5.2 | 7.0 |  | 5.2 | 7.0 | 17.0 | 3.10 | 4.17 | 10.13 | 2.10 | 2.83 | 6.87 | 200 | 182 | ¼ | Very soluble. |
| *Fifth Stage* | | | | | | | | | | | | | | | | |
| Resin to EtO Molal Ratio 1:20 Ex. No. 133b | 2.10 | 2.83 | 6.87 | 2.10 | 2.83 | 9.12 | | | | | | | 90 | 150 | ½ | Very soluble. |

*Phenol for resin: Para-tertiary amylphenol*   *Aldehyde for resin: Furfural*

Date, August 27-31, 1948

[Resin made on pilot plant size batch, approximately 25 pounds, corresponding to 42a of Patent 2,499,370 but this batch designated as 134a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 134b | 11.2 | 18.0 | ------ | 11.2 | 18.0 | 3.5 | 2.75 | 4.4 | 0.85 | 8.45 | 13.6 | 2.65 | 120 | 135 | ½ | Not soluble. |
| *Second Stage* | | | | | | | | | | | | | | | | |
| Resin to EtO Molal Ratio 1:5 Ex. No. 135b | 8.45 | 13.6 | 2.65 | 8.45 | 13.6 | 12.65 | 5.03 | 8.12 | 7.55 | 3.42 | 5.48 | 5.10 | 110 | 150 | ¼ | Somewhat soluble. |
| *Third Stage* | | | | | | | | | | | | | | | | |
| Resin to EtO Molal Ratio 1:10 Ex. No. 136b | 4.5 | 8.0 | ------ | 4.5 | 8.0 | 14.5 | 2.45 | 4.35 | 7.99 | 2.05 | 3.65 | 6.60 | 180 | 163 | ½ | Soluble. |
| *Fourth Stage* | | | | | | | | | | | | | | | | |
| Resin to EtO Molal Ratio 1:15 Ex. No. 137b | 3.42 | 5.48 | 5.10 | 3.42 | 5.48 | 15.10 | ------ | ------ | ------ | ------ | ------ | ------ | 180 | 188 | ½ | Very soluble. |
| *Fifth Stage* | | | | | | | | | | | | | | | | |
| Resin to EtO Molal Ratio 1:20 Ex. No. 138b | 2.05 | 3.65 | 6.60 | 2.05 | 3.65 | 13.35 | ------ | ------ | ------ | ------ | ------ | ------ | 120 | 125 | ½ | Very soluble. |

*Phenol for resin: Menthyl*   *Aldehyde for resin: Furfural*

Date, Sept. 23-24, 1948

[Resin made on pilot size batch, approximately 25 pounds, corresponding to 89a of Patent 2,499,370 but this batch designated as 139a.]

| | Starting Mix | | | Mix at End of Reaction | | | Mix Which is Removed for Sample | | | Mix Which Remains as Next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 139b | 10.25 | 17.75 | ------ | 10.25 | 17.75 | 2.5 | 2.65 | 4.60 | 0.65 | 7.6 | 13.15 | 1.85 | 90 | 150 | ⅙ | Not soluble. |
| *Second Stage* | | | | | | | | | | | | | | | | |
| Resin to EtO Molal Ratio 1:5 Ex. No. 140b | 7.6 | 13.15 | 1.85 | 7.6 | 13.15 | 9.35 | 5.2 | 9.00 | 6.40 | 2.4 | 4.15 | 2.95 | 80 | 177 | ⅙ | Somewhat soluble. |
| *Third Stage* | | | | | | | | | | | | | | | | |
| Resin to EtO Molal Ratio 1:10 Ex. No. 141b | 4.22 | 6.98 | ------ | 4.22 | 6.98 | 10.0 | ------ | ------ | ------ | ------ | ------ | ------ | 90 | 165 | ½ | Soluble. |
| *Fourth Stage* | | | | | | | | | | | | | | | | |
| Resin to EtO Molal Ratio 1:15 Ex. No. 142b | 3.76 | 6.24 | ------ | 3.76 | 6.24 | 13.25 | ------ | ------ | ------ | ------ | ------ | ------ | 100 | 171 | ½ | Very soluble. |
| *Fifth Stage* | | | | | | | | | | | | | | | | |
| Resin to EtO Molal Ratio 1:20 Ex. No. 143b | 2.4 | 4.15 | 2.95 | 2.4 | 4.15 | 11.70 | ------ | ------ | ------ | ------ | ------ | ------ | 90 | 150 | ½ | Very soluble. |

*Phenol for resin: Para-octyl*     *Aldehyde for resin: Furfural*

Date, October 7-8, 1948

[Resin made on pilot plant size batch, approximately 25 pounds, corresponding to 42a of Patent 2,499,370 with 206 parts by weight of commercial para-octylphenol replacing 164 parts by weight of para-tertiary amylphenol but this batch designated as 144a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 144b | 12.1 | 18.6 | ------ | 12.1 | 18.6 | 3.0 | 5.38 | 8.25 | 1.34 | 6.72 | 10.32 | 1.66 | 80 | 150 | ½ | Insoluble. |
| *Second Stage* | | | | | | | | | | | | | | | | |
| Resin to EtO Molal Ratio 1:5 Ex. No. 145b | 9.25 | 14.25 | ------ | 9.25 | 14.25 | 11.0 | 3.73 | 5.73 | 4.44 | 5.52 | 8.52 | 6.56 | 100 | 177 | ½ | Slight tendency toward becoming soluble. |
| *Third Stage* | | | | | | | | | | | | | | | | |
| Resin to EtO Molal Ratio 1:10 Ex. No. 146b | 6.72 | 10.32 | 1.66 | 6.72 | 10.32 | 14.91 | 4.97 | 7.62 | 11.01 | 1.75 | 2.70 | 3.90 | 85 | 182 | ¼ | Fairly soluble. |
| *Fourth Stage* | | | | | | | | | | | | | | | | |
| Resin to EtO Molal Ratio 1:15 Ex. No. 147b | 5.52 | 8.52 | 6.56 | 5.52 | 8.52 | 19.81 | ------ | ------ | ------ | ------ | ------ | ------ | 100 | 176 | ½ | Readily soluble. |
| *Fifth Stage* | | | | | | | | | | | | | | | | |
| Resin to EtO Molal Ratio 1:20 Ex. No. 148b | 1.75 | 2.70 | 3.90 | 1.75 | 2.70 | 8.4 | ------ | ------ | ------ | ------ | ------ | ------ | 80 | 160 | ¾ | Quite soluble. |

*Phenol for resin: Para-phenyl*     *Aldehyde for resin: Furfural*

Date, October 11–13, 1948

[Resin made on pilot plant size batch, approximately 25 pounds, corresponding to 42a of Patent 2,499,370 with 170 parts by weight of commercial paraphenylphenol replacing 164 parts by weight of para tertiary amylphenol but this batch designated as 149a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 149b | 13.9 | 16.7 | ------ | 13.9 | 16.7 | 3.0 | 3.50 | 4.25 | 0.80 | 10.35 | 12.45 | 2.20 | 100 | 160 | ½ | Insoluble. |
| *Second Stage* | | | | | | | | | | | | | | | | |
| Resin to EtO Molal Ratio 1:5 Ex. No. 150b | 10.35 | 12.45 | 2.20 | 10.35 | 12.45 | 12.20 | 5.15 | 6.19 | 6.06 | 5.20 | 6.26 | 6.14 | 80 | 183 | ½ | Slight tendency toward solubility. |
| *Third Stage* | | | | | | | | | | | | | | | | |
| Resin to EtO Molal Ratio 1:10 Ex. No. 151b | 8.90 | 10.7 | ------ | 8.90 | 10.70 | 19.0 | 5.30 | 6.38 | 11.32 | 3.60 | 4.32 | 7.68 | 90 | 193 | 7½ | Fairly soluble. |
| *Fourth Stage* | | | | | | | | | | | | | | | | |
| Resin to EtO Molal Ratio 1:15 Ex. No. 152b | 5.20 | 6.26 | 6.14 | 5.20 | 6.26 | 16.64 | ------ | ------ | ------ | ------ | ------ | ------ | 100 | 171 | ½ | Readily soluble. |
| *Fifth Stage* | | | | | | | | | | | | | | | | |
| Resin to EtO Molal Ratio 1:20 Ex. No. 153b | 3.60 | 4.32 | 7.68 | 3.60 | 4.32 | 15.68 | Sample somewhat rubbery and gelatinous but fairly soluble | | | | | | 230 | 170 | 2 | |

*Phenol for resin: Para-nonylphenol*    *Aldehyde for resin: Furfural*

Date, October 13–15, 1948

[Resin made on pilot plant size batch, approximately 25 pounds, corresponding to 88a of Patent 2,499,370 but this batch designated as 154a.]

|  | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| First Stage Resin to EtO Molal Ratio 1:1 Ex. No. 154b | 10.85 | 20.75 | ------ | 10.85 | 20.75 | 3.0 | 2.57 | 4.90 | 0.73 | 8.28 | 15.85 | 2.27 | 100 | 150 | ½ | Insoluble. |
| Second Stage Resin to EtO Molal Ratio 1:5 Ex. No. 155b | 8.28 | 15.85 | 2.27 | 8.28 | 15.85 | 11.77 | 3.82 | 7.33 | 5.45 | 4.46 | 8.52 | 6.32 | 100 | 182 | ⅙ | Slight tendency toward becoming soluble. |
| Third Stage Resin to EtO Molal Ratio 1:10 Ex. No. 156b | 5.95 | 11.35 | ------ | 5.95 | 11.35 | 16.75 | 3.38 | 6.42 | 9.50 | 2.57 | 4.93 | 7.25 | 100 | 181 | ½ | Fairly soluble. |
| Fourth Stage Resin to EtO Molal Ratio 1:15 Ex. No. 157b | 4.46 | 8.52 | 6.32 | 4.46 | 8.52 | 19.07 | ------ | ------ | ------ | ------ | ------ | ------ | 90 | 188 | ⅙ | Readily soluble. |
| Fifth Stage Resin to EtO Molal Ratio 1:20 Ex. No. 158b | 2.57 | 4.93 | 7.25 | 2.57 | 4.93 | 14.50 | ------ | ------ | ------ | ------ | ------ | ------ | 100 | 160 | ½ | Quite soluble. |

*Phenol for resin: Para-phenylphenol*    *Aldehyde for resin: Formaldehyde*

Date, October 15, 1948

[Resin made on pilot plant size batch, approximately 25 pounds, corresponding to 9a of Patent 2,499,370 but this batch designated as 159a.]

|  | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
|  | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO |  |  |  |  |
| First Stage Resin to EtO Molal Ratio 1:1 Ex. No. | ------ | ------ | ------ | ------ | ------ | ------ | ------ | ------ | ------ | ------ | ------ | ------ | ------ | ------ | ------ |  |
| Second Stage Resin to EtO Molal Ratio 1:5 Ex. No. 159b | 11.0 | 9.0 | ------ | 11.0 | 9.0 | 11.75 | 7.6 | 6.2 | 8.11 | 3.41 | 2.80 | 3.64 | 160 | 188 | ¼ | Insoluble. |
| Third Stage Resin to EtO Molal Ratio 1:10 Ex. No. | ------ | ------ | ------ | ------ | ------ | ------ | ------ | ------ | ------ | ------ | ------ | ------ | ------ | ------ | ------ |  |
| Fourth Stage Resin to EtO Molal Ratio 1:15 Ex. No. | ------ | ------ | ------ | ------ | ------ | ------ | ------ | ------ | ------ | ------ | ------ | ------ | ------ | ------ | ------ |  |
| Fifth Stage Resin to EtO Molal Ratio 1:20 Ex. No. 160b | 3.41 | 2.80 | 3.64 | 3.41 | 2.80 | 13.64 | ------ | ------ | ------ | ------ | ------ | ------ | 80 | 170 | ¼ | Soluble. |

*Phenol for resin: Para-secondary butylphenol*     *Aldehyde for resin: Furfural*

Date, October 19, 25, 1948

[Resin made on pilot plant size batch, approximately 25 pounds, corresponding to 42a of Patent 2,499,370 with 150 parts by weight of commercial para-secondary butylphenol replacing 164 parts by weight of para-tertiary amylphenol but this batch designated as 161a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 161b | 12.0 | 17.9 | | 12.0 | 17.9 | 3.5 | 2.65 | 3.98 | 0.77 | 9.35 | 13.92 | 2.73 | 150 | 171 | ⅛ | Insoluble. |
| *Second Stage* | | | | | | | | | | | | | | | | |
| Resin to EtO Molal Ratio 1:5 Ex. No. 162b | 9.35 | 13.92 | 2.73 | 9.35 | 13.92 | 13.23 | 5.00 | 7.42 | 7.08 | 4.35 | 6.50 | 6.15 | 100 | 192 | ⅓ | Slight tendency toward becoming soluble. |
| *Third Stage* | | | | | | | | | | | | | | | | |
| Resin to EtO Molal Ratio 1:10 Ex. No. 163b | 6.25 | 8.95 | | 6.25 | 8.95 | 17.0 | 3.23 | 4.61 | 8.76 | 3.02 | 4.34 | 8.24 | 120 | 188 | 5½ | Fairly soluble. |
| *Fourth Stage* | | | | | | | | | | | | | | | | |
| Resin to EtO Molal Ratio 1:15 Ex. No. 164b | 4.35 | 6.50 | 6.15 | 4.35 | 6.50 | 18.40 | | | | | | | 100 | 181 | ⅓ | Readily soluble. |
| *Fifth Stage* | | | | | | | | | | | | | | | | |
| Resin to EtO Molal Ratio 1:20 Ex. No. 165b | 3.02 | 4.34 | 8.24 | 3.02 | 4.34 | 16.49 | Sample somewhat rubbery and gelatinous but shows limited water solubility. | | | | | | 120 | 161 | ¾ | |

*Phenol for resin: Para-octylphenol*     *Aldehyde for resin: Propionaldehyde*

Date, October 27, 1948

[Resin made on pilot plant size batch, approximately 25 pounds, corresponding to 34a of Patent 2,499,370 with 206 parts by weight of commercial para-octylphenol replacing 164 parts by weight of para-tertiary amylphenol but this batch designated as 166a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* | | | | | | | | | | | | | | | | |
| Resin to EtO Molal Ratio 1:1 Ex. No. 166b | 13.3 | 16.9 | | 13.3 | 16.9 | 3.0 | 3.1 | 4.0 | 0.70 | 10.2 | 12.9 | 2.3 | 100 | 150 | ⅛ | Insoluble. |
| *Second Stage* | | | | | | | | | | | | | | | | |
| Resin to EtO Molal Ratio 1:5 Ex. No. 167b | 10.2 | 12.9 | 2.3 | 10.2 | 12.9 | 11.3 | 6.34 | 8.03 | 7.03 | 3.86 | 4.87 | 4.27 | 100 | 166 | ¼ | Becoming soluble. |
| *Third Stage* | | | | | | | | | | | | | | | | |
| Resin to EtO Molal Ratio 1:11 Ex. No. 168b | 6.46 | 8.24 | | 6.46 | 8.24 | 16.5 | 3.52 | 4.49 | 8.99 | 2.94 | 3.75 | 7.51 | 80 | 177 | ¼ | Fairly soluble. |
| *Fourth Stage* | | | | | | | | | | | | | | | | |
| Resin to EtO Molal Ratio 1:15 Ex. No. 169b | 3.86 | 4.87 | 4.27 | 3.86 | 4.87 | 13.0 | | | | | | | 80 | 204 | 14 | Readily soluble. |
| *Fifth Stage* | | | | | | | | | | | | | | | | |
| Resin to EtO Molal Ratio 1:20 Ex. No. 170b | 2.94 | 3.75 | 7.51 | 2.94 | 3.75 | 13.2 | | | | | | | 100 | 150 | ¼ | Soluble. |

*Phenol for resin: Para-nonylphenol*   *Aldehyde for resin: Propionaldehyde*

Date, October 28, 1948

[Resin made on pilot plant size batch, approximately 25 pounds, corresponding to 82a of Patent 2,499,370 but this batch designated as 171a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 171b | 10.9 | 18.0 | | 10.9 | 18.0 | 3.0 | 2.65 | 4.4 | 0.75 | 8.25 | 13.60 | 2.25 | 120 | 150 | ½ | Insoluble. |
| *Second Stage* Resin to EtO Molal Ratio 1:5 Ex. No. 172b | 8.25 | 13.60 | 2.25 | 8.25 | 13.60 | 11.50 | 5.10 | 8.35 | 7.05 | 3.15 | 5.25 | 4.45 | 95 | 174 | ⅙ | Becoming soluble. |
| *Third Stage* Resin to EtO Molal Ratio 1:10 Ex. No. 173b | 5.65 | 9.35 | | 5.65 | 9.35 | 15.75 | 3.71 | 6.14 | 10.35 | 1.94 | 3.21 | 5.40 | 90 | 182 | 5/12 | Fairly soluble. |
| *Fourth Stage* Resin to EtO Molal Ratio 1:15 Ex. No. 174b | 3.15 | 5.25 | 4.45 | 3.15 | 5.25 | 13.45 | | | | | | | 85 | 182 | ⅙ | Readily soluble. |
| *Fifth Stage* Resin to EtO Molal Ratio 1:20 Ex. No. 175b | 1.94 | 3.21 | 5.40 | 1.94 | 3.21 | 10.65 | | | | | | | 90 | 150 | ⅙ | Soluble. |

*Phenol for resin: Para-tertiary amylphenol*   *Aldehyde for resin: Propionaldehyde*

Date, October 28, 29, 1948

[Resin made on pilot plant size batch, approximately 25 pounds, corresponding to 34a of Patent 2,499,370 but this batch designated as 176a.]

| | Starting Mix | | | Mix at End of Reaction | | | Mix Which is Removed for Sample | | | Mix Which Remains as Next Starter | | | Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *First Stage* Resin to EtO Molal Ratio 1:1 Ex. No. 176b | 12.6 | 16.2 | | 12.6 | 16.2 | 3.5 | 3.08 | 3.96 | 0.86 | 9.52 | 12.24 | 2.64 | 105 | 150 | ½ | Insoluble. |
| *Second Stage* Resin to EtO Molal Ratio 1:5 Ex. No. 177b | 9.52 | 12.24 | 2.64 | 9.52 | 12.24 | 12.89 | 5.27 | 6.79 | 7.14 | 4.25 | 5.45 | 5.75 | 85 | 171 | ½ | Becoming soluble. |
| *Third Stage* Resin to EtO Molal Ratio 1:10 Ex. No. 178b | 6.5 | 8.3 | | 6.5 | 8.3 | 17.75 | 3.81 | 4.87 | 10.42 | 2.69 | 3.43 | 7.33 | 120 | 183 | ⅓ | Fairly soluble. |
| *Fourth Stage* Resin to EtO Molal Ratio 1:15 Ex. No. 179b | 4.25 | 5.45 | 5.75 | 4.25 | 5.45 | 17.25 | | | | | | | 85 | 196 | ⅙ | Readily soluble. |
| *Fifth Stage* Resin to EtO Molal Ratio 1:20 Ex. No. 180b | 2.69 | 3.43 | 7.33 | 2.69 | 3.43 | 14.55 | | | | | | | 95 | 160 | ⅙ | Soluble. |

PART 3

Having prepared or purchased suitable oxyalkylated derivatives to be used as alcoholic reactants, one can purchase or prepare various unsaturated monocarboxy detergent-forming acids characterized by the fact that they have at least 8 and not more than 22 carbon atoms. The next step is to prepare the esters of such unsaturated monocarboxy detergent-forming acids and the previously described oxyalkylated derivatives. The final step, after the preparation of the esters of the kind just described, is to subject them to drastic oxidation by means of a gaseous oxygen-containing medium, such as air, ozone, etc.

Reference is made to our co-pending application, Serial No. 64,454, filed December 8, 1948. Said co-pending application describes esters of the kind herein employed as intermediates, i. e., subjected to drastic oxidation. Said aforementioned application contemplates not only esters of unsaturated fatty acids, but also other esters, including saturated fatty acids. As previously stated, the unsaturated monocarboxy detergent-forming acid esters herein contemplated are limited to those derived from unsaturated fatty acids having 8 to 22 carbon atoms, and particularly those which have 18 carbon atoms. Such unsaturated fatty acids include oleic acid, ricinoleic acid, linoleic acid, linolenic acid, undecylenic acid, etc. One may employ mixed fatty acids, as for example, the fatty acids obtained from hydrolysis of cottonseed oil, soyabean oil, sunflower seed oil, dehydrated castor oil, etc.

As is well known, in the production of an ester, one need not use the acid itself for the introduction of the acyl or acyloxy group. Any suitable functional equivalents such as the acyl halide, the acyl anhydride, the ester amide, etc., may be employed. Reference is also made to our co-pending application Serial No. 42,138, filed August 2, 1948, which is a continuation-in-part of our now abandoned applications, Serial Nos. 518,660, and 518,661, both filed January 17, 1944, insofar that they describe the production of esters of certain unsaturated fatty acids, and more particularly, drying oils involving alcoholic bodies which are essentially the same hydroxylated reactants, as herein described.

It will be noted that having obtained a compound which is essentially a polyhydric alcohol, i. e., an oxyalkylated resin of the type herein contemplated, one can produce esters by any one of the various procedures employed for producing esters of detergent-forming acids and the more common polyhydric alcohols. As is well known, one may well employ not only the fatty acid itself, but any suitable derivative, for instance, the acyl chloride, the anhydride, etc. In some instances, trans-esterification or cross-esterification can be employed. For instance, the oxyalkylated derivatives can be heated with the ethyl or methyl ester of the selected acid in presence of an alkaline catalyst so as to eliminate methyl or ethyl alcohol. Such procedure is particularly desirable when a hydroxylated acid is used, such as ricinoleic acid, etc. Trans-esterification or cross-esterification can be employed in connection with a glyceride with the formation of glycerine, which, under conditions of reaction, probably polymerizes to give polyglycerols and thus gives a significant and many times a major proportion of the desired ester. It will be noted that part of what is said herein in regard to esterification and particularly in regard to the earlier examples, is comparable to what is said in our aforementioned co-pending application Serial No. 42,138, filed August 2, 1948, which, as previously stated, is a continuation-in-part of our now abandoned applications Serial Nos. 518,660 and 518,661, both filed January 17, 1944.

As to a rather complete review of the preparation of polyhydric alcohol esters of fatty acids, see "Chemical Review 33," 257–349 (1943).

Example 1c

An oxylated derivative, such as Example 121b, preceding, is esterified with soyabean oil fatty acids in an amount sufficient to convert approximately one-fourth of the polyglycol radicals into the fatty acid ester. The hydroxyl value of the oxyalkylated derivative can be calculated without determination, based on the hydroxyl value and weight of the phenolaldehyde resin originally employed, plus the increase in weight after oxyalkylation. If glycide or methylglycide is employed, allowance must be made for the polyhydric character of the oxyalkylating reactant. In any event, if desired, the hydroxyl value of the oxyalkylated product can be determined by the Verley-Bölsing method, or any other acceptable procedure. The esterification reaction is conducted in any conventional manner, such as that employed for the preparation of the higher fatty acid esters of phenoxyethanol.

Fatty acids, and particularly unsaturated fatty acids, show at least some solubility in the oxyalkylated derivatives of the kind shown in the previous examples, even though this is not necessarily true of the glycerides of the fatty acids. In this instance, reference is made to the oxyalkylated derivatives in the absence of a solvent. Since esterification is best conducted in solution, it is our preference to add xylene or even a higher boiling solvent, such as mesitylene, cymene, tetralin or the like, and conduct esterification in such consolute mixture. It is not necessary to add all the fatty acid at one time. One may add a quarter or half the total amount to be esterified, and after such portion of the reactant has combined, then add more of the fatty acid. The solubility of the fatty acid, of course, increases as the hydroxyl radical is replaced by an ester radical. This is also true if one resorts to trans-esterification or cross-esterification with the glyceride or low molal alcohol ester.

Our preference is to have present a substantial amount of xylene or higher boiling, water-insoluble solvent, and to distill under reflux condenser arrangement so that water resulting from esterification is volatilized and condensed along with the xylene vapor in a suitably arranged trap. The amount of xylene employed is approximately equal to one-half the weight of the mixed reactants. The water should be removed from the trap, either manually or automatically, and the xylene returned continuously for further distillation. Such reaction is hastened if a small amount of dry hydrochloric acid gas is continuously injected into the esterification mixture. When the reaction is completed, the xylene is removed by distillation. Small amounts of unreacted fatty acid can be converted into the methyl or ethyl ester and removed by vacuum distillation, or permitted to remain. For example, an excess of anhydrous ethyl alcohol can be added, and reacted so as to esterify any residual fatty acid, and then such excess of ethyl alcohol may be distilled off as 95% of alcohol—5% of water mixture; and thus, the water resulting from esterification with the alcohol can be removed. Although any residual fatty acid can be eliminated in the manner above described, this is of limited importance, except if one were preparing a drying oil fatty acid derivative which would ultimately find use in varnish production. In such instances elimination of all fatty acid is important to give enhanced alkali resistance.

However, even where the amount of fatty acid employed is stoichiometrically equal to the hydroxyl radicals present, we have not found it desirable to take any undue precaution to eliminate any residual fatty acid. As a matter of fact, numerous examples including the present one and those subsequently described yield partial or fractional esters in which there is present residual hydroxyl radicals. Under such circumstances, there are substantially no free fatty acid radicals present; and the products obtained by partial esterification, instead of complete esterification, represent the most valuable type. A sulfonic acid, such as toluene sulfonic acid, may be added in amounts of one-half to 1% to act as a catalyst.

As a specific example, 900 grams of the xylene-containing resin designated as "Example 121b," were reacted with 71 grams of soyabean fatty acid in the presence of 300 grams of additional xylene and 20 grams of para-toluene sulfonic acid. Reflux was continued for 3 hours, or until 4.5 grams of water had been evolved.

*Example 2c*

The same procedure was followed as in Example 1c, preceding, except that the amount of soyabean oil fatty acids employed was sufficient to convert one-half the polyglycol radicals into ester form.

As a specific example, 854 grams of the xylene-containing resin 116b were reacted with 142.3 grams of soyabean fatty acids in the presence of 200 grams of additional xylene and 15 grams of para-toluene sulfonic acid at 140° C. until 9 grams of water had been evolved. This took about 4 hours.

*Example 3c*

The same procedure was followed as in Example 1c, preceding, except that the amount of soyabean oil fatty acids employed were sufficient to convert three-fourths of the polyglycol radicals into ester form.

As a specific example, 511 grams of the xylene-containing resin 125b were reacted with 212.5 grams of soyabean fatty acid in the presence of 200 grams of additional xylene and 15 grams of para-toluene sulfonic acid at 145° C. to 147° C. for 3½ hours. 14.5 grams of water were evolved.

*Example 4c*

The same procedure was followed as in Example 1c, preceding, except that the amount of soyabean oil fatty acids employed was sufficient to convert substantially all of the polyglycol radicals into ester form.

*Example 5c*

The same procedure was followed as in Examples 1c to 4c, preceding, except that the oxyalkylated derivative, instead of being the kind exemplified under the heading of Example 121b, was resin exemplified by either Example 106b or 132b.

*Example 6c*

The same procedure was followed as in Examples 1c to 4c, preceding, except that the oxyalkylated thermoplastic phenolaldehyde resin was one of the type exemplified by Examples 106b to 120b, preceding, instead of one of the type exemplified by Examples 120b to 140b, inclusive.

*Example 7c*

The same procedure was followed as in Examples 1c to 6c, preceding, except that soybean oil fatty acid was replaced by other unsaturated fatty acids, such as linoleic or linolenic or the mixed fatty acids obtained from peanut oil, sunflower seed oil, or the like. The diene fatty acids obtained from dehydrated castor oil may be employed.

*Example 8c*

The same procedure was followed as in Examples 1c to 6c, preceding, except that instead of employing soyabean oil fatty acid, a marine oil fatty acid such as the fatty acids obtained from hydrolysis of menhaden oil, is employed.

*Example 9c*

The same procedure was followed as in Examples 1c to 6c, preceding, except that instead of soyabean oil fatty acids, one employs instead a hydroxylated unsaturated fatty acid, such as ricinoleic acid, diricinoleic acid, or fatty acids obtained by treating a polyene fatty acid, such as linseed oil, with peroxide so as to convert part of the olefinic linkages into hydroxyl groups.

*Example 10c*

The same procedure was followed as in the preceding examples, except that the reaction was conducted by means of the ethyl or methyl ester instead of the fatty acid. The reaction was conducted preferably in the absence of any solvent, or if a solvent be employed, it should be fairly high boiling, such as xylene. Instead of using an acid catalyst, an alkali such as caustic soda or sodium methylate was employed. The amount used varies from one-tenth of 1% to 1%. An average value may be in the neighborhood of one-half of 1%. The reaction was conducted preferably with the methyl ester, which results in the elimination of methanol. In the presence of a solvent such as xylene, the methanol might distill over with the xylene, and if so, can be removed by washing with water, followed by removal of any moisture from the xylene, with subsequent return of xylene to the reaction vessel. However, any suitable procedure and any suitable catalyst may be employed so as to form the ester by elimination of a low molal alcohol, particularly methanol. The series of preceding examples, to wit, Examples 1c to 9c, inclusive, used various fatty acids. These should be replaced with a molecular equivalent of methyl oleate, methyl recinoleate, methyl linoleate, etc.

As a specific example, 900 grams of xylene-containing resin 121b were reacted with 85.6 grams of methyl oleate in the presence of 200 grams of additional xylene and 2 grams of sodium methylate. After heating 4 hours at reflux (146° C.–148° C.) about 32 grams of methyl alcohol had been recovered by aqueous extraction from the xylene in the D-S trap. The xylene was returned to the reaction vessel.

*Example 11c*

The same procedure was followed as in the preceding examples, except that the ester was produced by cross-esterification or trans-esterification employing a glyceride so as to result in the formation of a non-volatile alcohol instead of a volatile alcohol as in Example 10c, preceding. The catalyst used was an alkaline catalyst and the temperature employed was approximately 200° to 225° C. The time of reaction may vary somewhat, but generally requires 3 to 8 hours. The temperature should be high enough to assure trans-esterification in presence of the alkaline catalyst, but in any event, should be below the point of pyrolysis, as far as the oxyalkylated derivatives or fatty acid is concerned. As a rule, pyrolysis may take place at any temperature above 250° C. In the preceding Example 10c, the fatty acid was replaced by an equivalent molar proportion of the methyl or ethyl ester. In this instance it was replaced by an equivalent molar proportion of glyceride, and particularly specific oxyalkylated resin employed and previously described; the third column indicates the amount of resin solution employed, including the xylene present as a solvent; the fourth column indicates the amount of xylene present in the corresponding item in the previous column; the fifth column indicates the specific fatty acid, or mixed fatty acid, employed; the sixth column indicates the weight of fatty acid employed; the seventh column indicates the amount of para-toluene sulfonic acid used as a catalyst; the eighth column indicates the reflux temperature during ester formation; the ninth column indicates the amount of water which distilled over in the reflux trap; and the tenth column indicates the time of the reflux period after reaching temperature.

| Ex. No. | Resin Ex. No. | Resin sol. used, Wt. grams | Xylene in resin, grams | Acid Used | Fatty Acid, Wt. Grams | P. T. S. A., Wt. Grams | Temp. deg., C. | Water off, Grams | Time, hrs. |
|---|---|---|---|---|---|---|---|---|---|
| 12c | 111b | 400 | 77.4 | Oleic | 93.4 | 20 | 145 | 10.7 | 6¾ |
| 13c | 122b | 300 | 71.3 | ---do--- | 71.5 | 20 | 145 | 6.1 | 2½ |
| 14c | 133b | 300 | 44.7 | ---do--- | 62.5 | 20 | 142 | 2.6 | 5 |
| 15c | 136b | 300 | 50 | ---do--- | 103.2 | 15 | 148 | 9.2 | 5 |
| 16c | 106b | 300 | 61.6 | Soya | 109.2 | 20 | 151 | 9.0 | 5½ |
| 17c | 128b | 300 | 37.8 | ---do--- | 70.8 | 20 | 145 | 8.3 | 6½ |
| 18c | 117b | 300 | 54.6 | Linoleic | 79.0 | 20 | 152 | 9.0 | 8½ |
| 19c | 118b | 300 | 48.2 | Soya | 63.8 | 20 | 148 | 5.8 | 7¾ |
| 20c | 113b | 300 | 49.0 | ---do--- | 63.8 | 20 | 148 | 5.4 | 7½ |
| 21c | 121b | 300 | 71.5 | ---do--- | 101.9 | 20 | 149 | 3.1 | 5½ |
| 22c | 123b | 300 | 45.4 | ---do--- | 65.1 | 20 | 147 | 5.1 | 2½ |
| 23c | 131b | 300 | 51.6 | ---do--- | 99.0 | 20 | 147 | 6.0 | 3¼ |
| 24c | 137b | 300 | 50.0 | ---do--- | 68.8 | 15 | 146 | 5.8 | 4¼ |
| 25c | 117b | 300 | 54.6 | Ricinoleic | 83.5 | 20 | 144 | 6.6 | 6½ |
| 26c | 112b | 300 | 62.5 | ---do--- | 79.1 | 20 | 147 | 8.3 | 6¾ |
| 27c | 132b | 300 | 53.5 | ---do--- | 78.2 | 10 | 148 | 2.0 | 2½ |
| 28c | 137b | 300 | 50 | ---do--- | 82.3 | 15 | 148 | 3.9 | 4¼ |
| 29c | 121b | 300 | 71.5 | ---do--- | 100.0 | 20 | 146 | 4.6 | 5 | the glyceride in the form of a naturally-occurring oil. Our preference is to use triolein, triricinolein, linseed oil, castor oil, the glycerol ester obtained from the various fatty acids previously enumerated in Examples 1c to 11c, inclusive. Dehydrated castor oil may be employed.

In reactions of the kind with the liberation of a non-volatile alcohol, it is quite likely the reaction does not go to completion. However, the equilibrium apparently permits a significant or substantial yield, due, in part, to the fact that the glycerol forms polyglycerols with comparative ease, whereas, the hydroxyl radicals of the oxyalkylated derivatives may etherize to a lesser degree. There is also the possibility that in part the glycerol may etherize with the oxyalkylated derivative. This brings about the same result as if the oxyalkylated derivative had been treated with a mole of glycide as a terminal reactant.

We have prepared a large number of esters from a variety of unsaturated fatty acids and also from a variety of mixed fatty acids obtained by the hydrolysis of various fats or oils without an effort to separate such mixtures. We call particular attention to the fatty acids available from various sources, such as those prepared by Armour & Company and sold under the trade name of "Neo-fat" fatty acids. These are described completely in a booklet distributed by the Chemical Division of Armour & Company, Chicago, Illinois. We make particular reference to Neofat 3, Neofat 3R, Neofat S142, Neofat D142, Neofat 19, Neofat 23, DD Cottonseed Fatty Acids, DD Corn Oil Fatty Acids, DD Soyabean Fatty Acids, and DD Linseed Fatty Acids.

Some of the fatty acids which give particularly valuable products are enumerated in the following table: The first column indicates the example number; the second column indicates the One rather peculiar property is the fact that where some of the oxyalkylated resins show moderate or limited solubility in water prior to esterification, particularly in the manner last indicated, they sometimes seem to show even greater solubility in water after such esterification process, notwithstanding the fact that apparently a large hydrophobe radical is introduced, and in essence, the repetitious alkylene oxide linkage apparently must solubilize both hydrophobe radicals, i. e., the one derived from the resin and the one derived from the unsaturated higher fatty acid.

It has been pointed out previously that the oxyalkylated resins vary from semi-solids or solids, or sticky solids, to liquids, showing little or no viscosity, or, in any event, viscosity no greater than that of castor oil. Needless to say, if a solvent such as xylene is present, the viscosity is reduced and the solution of a solid may become a liquid. The water-soluble or dispersible characteristics of the oxyalkylated resins have been described previously in detail; also their surface-activity or sub-surface-activity. The color of these oxyalkylated resins varies from almost colorless to deep amber, dark brown, or black, or reddish-black. The esters produced show the same variation, except, as a rule, the color becomes darker, particularly when para-toluene sulfonic acid is used as a catalyst, and particularly if the air is not excluded during esterification. The solubility in water, or dispersibility, is almost invariably reduced by the introduction of a sizeable hydrophobe group. In some instances, this reduction in water solubility or water dispersibility does not seem to take place. As the materials become esterified, there is a tendency to reduce the viscosity, as far as going from solids to semi-solids or liquids go, or as far as tackiness goes. In some instances where the oxyalkylated derivatives are liquids prior to esterification, there seems to be no change in viscosity, or, at last, a modest increase. Experience has indicated that practically all, or many, of these products can be bleached with clays, charcoal or the like, to produce products which are much lighter in color, and, if desired, the solvent present, i. e., xylene, can be removed by distillation, and particularly vacuum distillation. For purpose of preparing derivatives to be used in demulsification, these steps are unnecessary and the products prepared as described are very effective. This is also true of application in other arts.

PART 4

Having obtained unsaturated fatty acid esters of the kind described, they are subjected to drastic oxidation in much the same way that is employed in producing blown castor oil, blown soyabean oil, blown neat's-foot oil, etc. It is well known that oxidized oils can be obtained from castor oil, ricinoleic acid, and various derivatives of ricinoleic acid, such as monoricinolein, diricinolein, and polyricinoleic acid. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc., or it may be of the organic type which produces peroxide such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8-10 hours; or it may be quite extensive, for instance, as long as 10-12-14 days, the longer time periods being employed generally when the temperature is just slightly above the boiling point of water, and when oxidation is with air at atmospheric pressure.

One method of preparing drastically-oxidized castor oil is described in U. S. Patent No. 2,023,979, dated December 10, 1935, to Stehr. Also, see U. S. Patent No. 2,183,487, dated December 12, 1949, to Colbeth.

In our previously mentioned co-pending application Serial No. 30,183, filed May 29, 1948, we described the oxidation of the hydrophile hydroxylated oxyalkylated resins identified by numerals followed by the letter "b," of which there have been a large number of examples. In that particular application we were concerned with the same sort of drastic oxidation step as herein employed, but with the oxidation of the polyhydric alcohol as distinguished from the partial or complete ester. There is every indication that, in addition to the oxidation of the fatty material which introduces complexities of the kind which are present in the oxidation of castor oil, there is also oxidation of the kind described in our co-pending application Serial No. 30,183, filed May 29, 1948. For this reason, and in order to shed greater light on this series of complicated changes which take place, the following is quoted verbatim:

"This example (i. e., an oxidized unesterified oxyalkylated resin, particularly 1b) clearly illustrates the products obtained by drastic oxidation of the oxyalkylated thermoplastic phenol-aldehyde resins employing a gaseous oxygen-containing medium. The changes that take place are so marked that there is no question as to the nature of the product which has been subjected to oxidation. In the first place, there is an enormous increase in viscosity; in fact, if drastic oxidation is continued, the entire mass becomes stringy, sub-rubbery, or rubbery, and insoluble in any one of numerous solvents, such as xylene, diethylether of ethylene glycol, or diethylether of diethylene glycol, or mixtures of aromatic solvents and alcohols, such as butyl alcohol.

"However, as soon as there is any marked change in viscosity there is also a marked change in water-solubility, or in the hydrophile property of the compound. In other words, if one starts with an oxyalkylated resin which shows self-emulsifiability prior to drastic oxidation, this property will be reduced greatly or will almost disappear short of the sub-rubbery stage. If one employs an oxyalkylated resin which shows complete water-solubility, then after drastic oxidation, this property will be largely lost or almost completely disappear. Such drastically-oxidized product still has some hydrophile characteristics, due to the obvious presence of oxygen atoms. Thus, the characteristic properties of the oxidized products are (1) reduced hydrophile property, (2) increased viscosity, and (3) indications that further oxidation may readily convert the product to a stringy or sub-rubbery stage. It may seem that the properties previously noted could be related to ester formation. In other words, one could assume that oxidation converts some of the hydroxyl radicals to carboxyl radicals, and these, in turn, esterify with some of the remaining hydroxyl radicals to produce esters. Such cross-linking would, of course, account for properties of the kind previously described, if such esterification did take place. However, chemical examination of the drastically-oxidized product indicates little or no increase in either the acid number, or in the saponification number, at least insufficient to account for the change. Thus, as one would expect, saponification does not regenerate the corresponding parent type of material. It is possible that the change which takes place involves formation of ether linkages between alkylene radicals or residues."

In light of what has been said previously, it hardly appears necessary to include any examples of the final drastically-oxidized ester. However, as a matter of convenience, the invention may be illustrated by the following examples:

*Example 1d*

A thermoplastic resin is prepared from amyl or butyl phenol and formaldehyde in the manner described and illustrated by certain of the Examples 1a-103a of our Patent 2,499,370. Such resin is then divided into three parts and one portion treated with ethylene oxide equal to 1½ times the weight of the resin. The second portion is treated with ethylene oxide equal to three times the weight of the resin. The third portion is treated with ethylene oxide equal to 4½ times the weight of the resin. Each of these three portions is reacted with the ethyl or methyl ester of ricinoleic acid in presence of an alkaline catalyst, so as to eliminate the low molal alcohol and from the ricinoleic acid ester. Our preference is to use the stoichiometric amount so as to convert all the hydroxyl radicals into ester radicals. Each of the three esters thus obtained is subjected to low temperature oxidation by means of air until the drastically-oxidized product is just short of reaching a rubbery or insoluble state. Our preference is to use a temperature varying from between 95° C. and 110° C., and to oxidize for about 5 to 10 days. The initial products, prior to oxidation, have a light to medium amber appearance, and the final products have a definitely dark amber appearance and are much more viscous than the initial products.

Example 2d

The same procedure is followed as in the preceding example, except that the methyl or ethyl esters of soyabean fatty acid are employed so as to introduce fatty acids of the kind which occur naturally in soyabean oil.

Example 3d

The same procedure is followed as in Example 1d, preceding, except that the methyl or ethyl ester of undecylenic acid is employed. Our experience has been that generally the period of oxidation must be extended approximately 25%, for the reason that these esters do not oxidize quite as rapidly, as a rule.

Example 4d

The same procedure is followed as in Example 1d, preceding, except that the methyl or ethyl esters of rapeseed oil fatty acids are employed.

Example 5d

The same procedure is followed as in Example 1d, preceding, except that the esters derived from menhaden oil after partial hydroxylation by means of hydrogen peroxide, are employed.

Example 6d

The same procedure is followed as in Example 1d, preceding, except that the methyl or ethyl esters derived from dehydrated castor oil, are employed.

Example 7d

The same procedure is followed as in the six previously examples, except that a stoichiometric equivalent of propylene oxide is employed instead of ethylene oxide.

It may seen, at first casual examination, that the same products could be obtained by esterifying the fatty acids of properly selected blown oils with the oxyalkylated resins. Such is not the case apparently for two reasons. In the first place, converting blown glycerides of any kind, for instance, blown castor oil or blown dehydrated castor oil, into the corresponding methyl or ethyl ester, produces certain changes in structure, for the reason that such drastically-oxidized products contain hydroxy acid esters thereof, anhydrides, and other compounds which are susceptible to change during saponification or esterification. In the second place, the mere oxidation of oxyalkylated thermoplastic phenol-aldehyde resins herein described, produces certain changes which are not understood, but which clearly affect the properties of such material, all of which is described in our co-pending application Serial No. 30,183, filed May 29, 1948.

Referring to the large series of examples which have been produced and described in Part 3, preceding, we have preferred to do as follows in the oxidation stage. In the first place, after esterification, we have made it a point to remove all the xylene, either permitting the xylene to be caught in the trap and removed, or else making the usual connection with the condenser so as to remove the xylene or use a vacuum pump and a temperature up to 130° or 135° C. If desired, of course, the xylene can be left in the mass, for the reason that as gaseous oxidation starts, the xylene is gradually removed by mere passage of air or the like. This, however, means an unnecessary loss of xylene, particularly on a large scale. Secondly, we prefer to neutralize any sulfonic acid present as a catalyst, adding just the required amount of the concentrated 25% caustic solution. In the following experiments which are tabulated below, the particular esters employed are those which have been described previously in Part Three. In each case we employed approximately 1,000 grams of the ester and a temperature approximately 110° to 115° C. A continuous stream of air was passed through the mixture and the material oxidized until there was a drastic change, as previously noted, i. e., a darkening of the product along with a marked change in viscosity. In most cases attempt was made to blow the products until they were as thick as possible without being livery or suggestive that they would shortly enter the gelation or semi-rubbery stage. The oxidation invariably darkened the materials, increased their viscosity, and, in fact, made them much more viscous and invariably darkened the products, and frequently they had a tacky or almost incipient tacky nature.

In each case, however, the state of oxidation was stopped at such a point that the final product was still soluble in a solvent, particularly xylene or the like. Furthermore, in all these particular experiments listed in the table, and for that matter, the others described previously, the final products met the same qualification test for presence of hydrophile properties previously noted in connection with the oxyalkylated resins themselves, i. e., the xylene solution, when shaken with water, produced an emulsification as previously described.

In the following table the first column indicates the example number; the second column indicates the particular ester previously described; the third column the amount of ester oxidized, which was generally 1,000 grams, the fourth column indicates the temperature of oxidation which was generally in the neighborhood of 110° C.; the fifth column indicates oxidizing agent used, which was air, without any attempt to dry the air; the sixth column shows the air stream rate. In the oxidation of a 1,000 gram sample we have used a flask of approximately 3 liter capacity so as to allow room for a foam build-up without a carry-over where this occurred. Also, it is quite possible that as foam build-up starts, oxidation takes place in the foam to a considerable degree, rather than in the mere passage of the air bubble through the liquid phase. We have considered a slow rate as being one where we attempted to permit a bubble to reach the top of the fluid before the next bubble apeared. We have considered a fast rate as one in which a multiplicity of bubbles are passed through as rapidly as possible without forcing the foam out of the oxidation flask. We have considered a medium rate as one somewhere in between, i. e., a multiplicity of bubbles passing through the liquid layer at all times, but not in a stream sufficient to force foam out of the flask. This particular value is not critical.

The seventh column indicates the time of oxidation and generally lasts from 100 hours to about 150 hours, or approximately five, six, or seven days. The time is indicated in days.

The products were generally dark in color and highly viscous.

The eighth column indicates whether or not the product is soluble in xylene, or, in some instances, more soluble in the diethylester of ethylene glycol, or the diethylester of diethylene glycol. The word "yes" simply means that the sample did meet the solubility requirements.

fices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion

| Ex. No. | Ex. No. of Ester | Grams | Temp. of Oxidation, °C. | Ox. Agt. Used | Air Stream Rate | Time, days | Solubility Final Prod. |
|---|---|---|---|---|---|---|---|
| 8d | 12c | 1,000 | 110 | Air | Medium | 6 | Yes |
| 9d | 13c | 1,000 | 111 | do | do | 5½ | Yes |
| 10d | 16c | 1,000 | 109 | do | do | 7 | Yes |
| 11d | 18c | 1,000 | 111 | do | do | 4¾ | Yes |
| 12d | 19c | 1,000 | 108 | do | do | 6 | Yes |
| 13d | 20c | 1,000 | 112 | do | do | 6 | Yes |
| 14d | 21c | 1,000 | 111 | do | do | 6½ | Yes |
| 15d | 22c | 1,000 | 109 | do | do | 6 | Yes |
| 16d | 25c | 1,000 | 112 | do | do | 5½ | Yes |
| 17d | 26c | 1,000 | 108 | do | do | 6¾ | Yes |
| 18d | 29c | 1,000 | 110 | do | do | 7½ | Yes |

In some few instances where oxidation does not seem to take place as rapidly as it should, we have found that all that was required was to add about 1/10 of 1% of a catalyst previously referred to, such as manganese naphthenate, cobalt naphthenate, etc. Sometimes a little less is more than enough, and other times the amount of catalyst can be increased moderate, for instance, twice as much.

PART 5

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases fluxing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings sufthrough any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the drastically-oxidized esterified oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1c, with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated, in part, by economic considerations, i. e., cost.

As noted above, the products herein described may be used not only in diluted form, but also may be used admixed with some other chemical demulsifier. The following mixture illustrates such a combination:

Drastically-oxidized ester of oxyalkylated derivative, for example, the product of Example 10d, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of derivatives of oxyalkylated resinous compounds for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself. As an example of such procedure, reference is made to our co-pending applications Serial Nos. 64,443, filed December 8, 1948, and 74,474, filed February 3, 1949.

Having thus described our invention, what we claim as new and desire to secure by Letters Patent is:

1. A process for breaking petroleum emulsions of the water-in-oil type, characterized by subjecting the emulsion to the action of a demulsifier including a drastically-oxidized ester in which the acyl radical is that of an unsaturated monocarboxy acid having at least 8 and not more than 22 carbon atoms, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

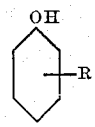

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; with the further proviso that the hydrophile properties of the ester as well as the oxyalkylated resin in an equal weight of xylene are sufficient to produce an emulsion when said xylene solution is shaken vigorously with one to three volumes of water; and with the final proviso that said drastic oxidation of the ester be by means of a gaseous oxygen-containing medium.

2. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

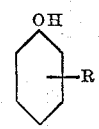

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; with the further proviso that the hydrophile properties of the ester as well as the oxyalkylated resin in an equal weight of xylene are sufficient to produce an emulsion when said xylene solution is shaken vigorously with one to three volumes of water; and with the final proviso that said drastic-oxidation of the ester be by means of a gaseous oxygen-containing medium.

3. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

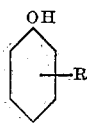

in which R is a hydrocarbon radical having at least 4 and not more than 12 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said drastic-oxidation of the ester be by means of a gaseous oxygen-containing medium.

4. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of trifunctional phenols; said phenol being of the formula:

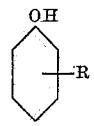

in which R is a hydrocarbon radical having at least 4 and not more than 12 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introuduced for each phenolic nucleus; with the further proviso that the hydrophile properties of the ester as well as the oxyethylated resin in an equal weight of xylene are sufficient to produce an emulsion when said xylene solution is shaken vigorously with one to three volume of water; and with the final proviso that said drastic-oxidation of the ester be by means of a gaseous oxygen-containing medium.

5. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive toward said phenol; said resin being formed in the substantial absence of trifunctional phenols; said phenol being of the formula:

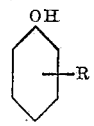

in which R is an aliphatic hydrocarbon radical having at least 4 and not more than 12 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said drastic-oxidation of the ester be by means of a gaseous oxygen-containing medium.

6. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol; and an aliphatic aldehyde having not over 8 carbon atoms and reactive toward said phenol; said resin being formed in the substantial absence of trifunctional phenols; said phenol being of the formula:

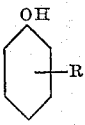

in which R is an aliphatic hydrocarbon radical having at least 4 and not more than 12 carbon atoms and substituted in the 2,4,6 position; said oxyethylated resin being characterized by the introduction into the resin molecule of a plurality of divalent radicals having the formula (C₂H₄O)n wherein n is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said drastic-oxygen of the ester be by means of a gaseous oxygen-containing medium.

7. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

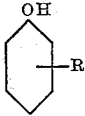

in which R is an aliphatic hydrocarbon radical having at least 4 and not more than 12 carbon atoms and substituted in the 2,4,6 position; said oxyethylated resin being characterized by the introduction into the resin molecule of a plurality of divalent radicals having the formula (C₂H₄O)n wherein n is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said drastic-oxidation of the ester be by means of a gaseous oxygen-containing medium.

8. A process for breaking petroleum emulsions of the water-in-oil type, characterized by subjecting the emulsion to the action of a demulsifier including a drastically-oxidized ricinoleate of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage, acid-catalyzed phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

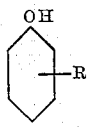

in which R is an aliphatic hydrocarbon radical having at least 4 and not more than 12 carbon atoms and substituted in the 2,4,6 position; said oxyethylated resin being characterized by the introduction into the resin molecule of a plurality of divalent radicals having the formula (C₂H₄O)n; wherein n is a numeral varying from 1 to 20; with the proviso that at least 2 moles of ethylene oxide be introduced for each phenolic nucleus; with the further proviso that the hydrophile properties of the ester as well as the oxyethylated resin in an equal weight of xylene are sufficient to produce an emulsion when said xylene solution is shaken vigorously with one to three volumes of water; and with the final proviso that said drastic-oxidation of the ester be by means of a gaseous oxygen-containing medium.

9. The process of claim 6, wherein R is substituted in the para position.

10. The process of claim 6, wherein R is a butyl radical substituted in the para position.

11. The process of claim 6, wherein R is an amyl radical substituted in the para position.

12. The process of claim 6, wherein R is a nonyl radical substituted in the para position.

13. The process of claim 7, wherein R is substituted in the para position.

14. The process of claim 7, wherein R is a butyl radical substituted in the para position.

15. The process of claim 7, wherein R is an amyl radical substituted in the para position.

16. The process of claim 7, wherein R is a nonyl radical substituted in the para position.

17. The process of claim 8, wherein R is substituted in the para position.

18. The process of claim 8, wherein R is a butyl radical substituted in the para position.

19. The process of claim 8, wherein R is an amyl radical substituted in the para position.

20. The process of claim 8, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,307,495 | De Groote et al. | Jan. 5, 1943 |
| 2,454,541 | Bock et al. | Nov. 23, 1948 |
| 2,454,544 | Bock et al. | Nov. 23, 1948 |
| 2,454,545 | Bock et al. | Nov. 23, 1948 |